Dec. 8, 1970   G. BECKWELL   3,545,089
DEVICE FOR MEASURING ANGULAR DEVIATION
OF PORTIONS OF A WORKPIECE
Filed Jan. 21, 1969   2 Sheets-Sheet 1

INVENTOR
George Beckwell
BY Hofgren, Wegner, Allen, Stellman & McCord
ATTORNEYS

Dec. 8, 1970    G. BECKWELL    3,545,089
DEVICE FOR MEASURING ANGULAR DEVIATION
OF PORTIONS OF A WORKPIECE
Filed Jan. 21, 1969    2 Sheets-Sheet 2
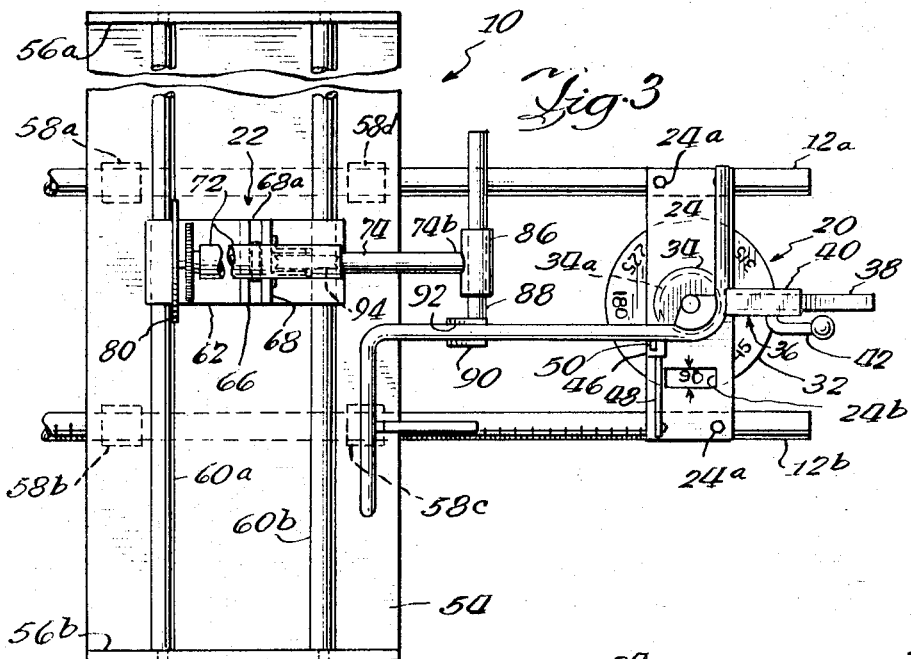
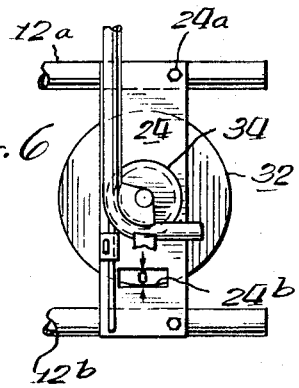
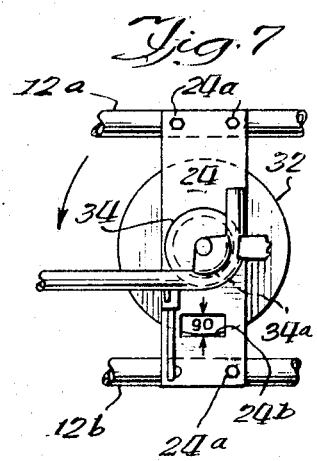
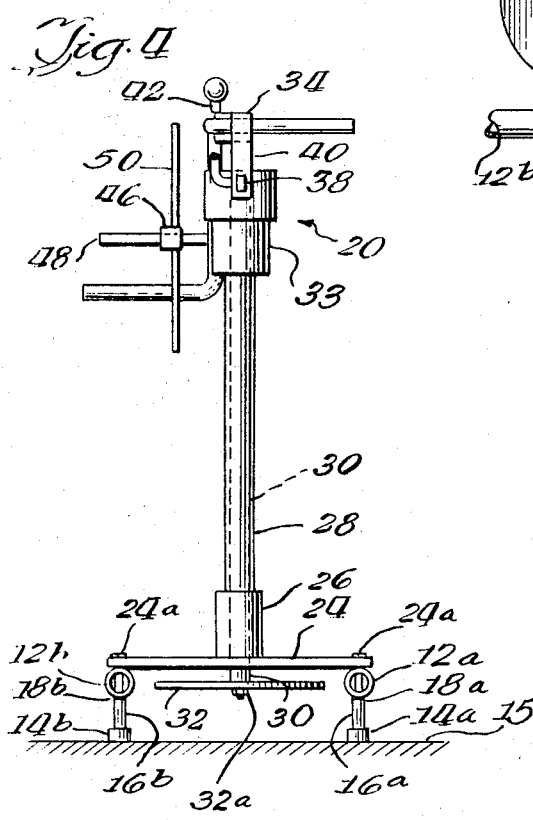
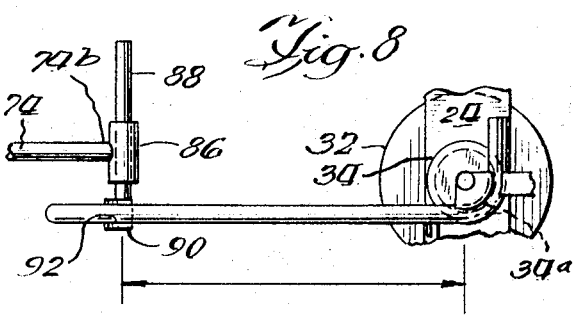
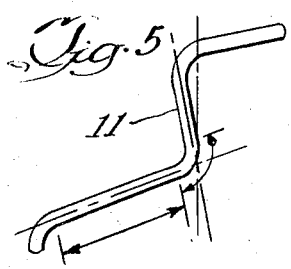
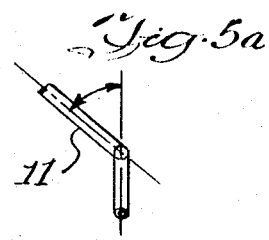

United States Patent Office 3,545,089
Patented Dec. 8, 1970

3,545,089
DEVICE FOR MEASURING ANGULAR DEVIATION OF PORTIONS OF A WORKPIECE
George Beckwell, Sugar Grove, Ill., assignor to Pines Engineering Co., Inc., a corporation of California
Filed Jan. 21, 1969, Ser. No. 792,630
Int. Cl. G01b 5/24
U.S. Cl. 33—174         11 Claims

ABSTRACT OF THE DISCLOSURE

A mechanism for measuring the angular and planar disposition of bends in tubular stock and the linear distance between such bends or planar variations, characterized by a workpiece gripping area having angular deviation measuring means associated therewith and a workpiece receiving element spaced therefrom and connected to scale means for measuring the angular disposition of the bend received thereat and for measuring the distance between the tube bends responsive to the orientation of the gripping and receiving elements to secure adjacent bends of the tube.

BACKGROUND OF THE INVENTION

Field of the invention

This invention relates to a mechanism for measuring the angular deviations in workpieces of cylindrical or tubular stock.

BRIEF DESCRIPTION OF THE PRIOR ART

To applicant's knowledge there has not been any mechanism for measuring angular and planar disposition of portions of tubular or rod or bar-like workpieces. Previously, this has been done by simple rulers and protractors applied to the lengths and bends of the tubing or to a tracing thereof. In the art of tube bending machinery, as well as in other fields, there has arisen recent developments in the form of computerized programming of machine functions, such as by numerical control instruments. These devices are programmed for certain functions and direct the machine accordingly. In order to establish an accurate program from a prototype product, it is necessary to have accurate dimensions of the configuration of the product so that these values may be introduced into the programming means. In the art of tube bending by numerically controlled machines for tube bending, there has been no satisfactory mechanism for accurately measuring the location and angular value of complex tubing bends. Thus, a need and desire for such a mechanism has arisen in the art.

SUMMARY OF THE INVENTION

This invention is directed, in brief, to the provision of a mechanism for measuring the location and angular deviation of bends in a tubular workpiece.

The best mode currently contemplated by me for carrying out the invention includes the provision of a tube bend clamping element associated with means for measuring angular deviation of a tube bend and a tube bend receiving element spaced from the gripping element, the tube bend receiving element being universally adjustable and associated with scale means for measuring the distance between the receiving element and the gripping element, and also associated with means for measuring the angular deviation of the bend received in the receiving element.

BRIEF DESCRIPTION OF THE DRAWINGS

FIG. 3 is a top plan view of the apparatus shown in FIG. 1;

FIG. 4 is a fragmentary end elevational view of the apparatus shown in FIGS. 1 through 3;

FIGS. 5 and 5a are perspective views of an example of tubular stock having bends and planar deviations to be measured by the apparatus of this invention;

FIG. 6 is a fragmentary top plan view of a portion of the apparatus of this invention showing a member of tubular stock initially received in the gripping element;

FIG. 7 is a view similar to FIG. 6 showing the tubular stock moved against a stop to a position where the angular value of the bend in the tubular stock can be measured; and FIG. 8 is a fragmentary top plan view of the apparatus of this invention showing the gripping and receiving elements thereof.

Figure 1:
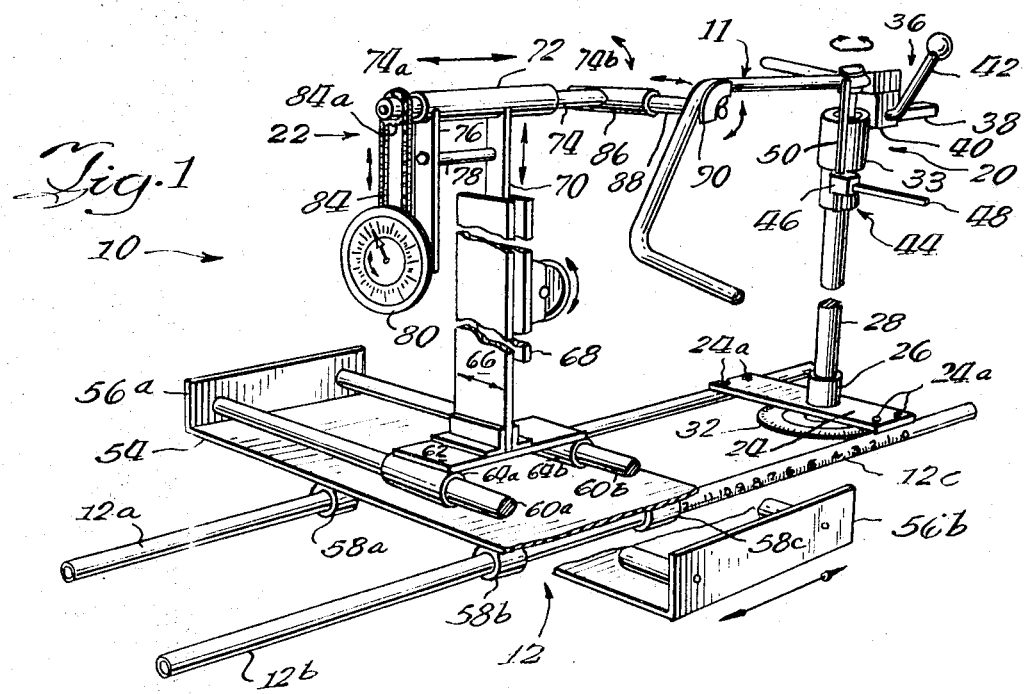
FIG. 1 is a perspective view of the tube bend measuring apparatus of this invention.
Figure 2:
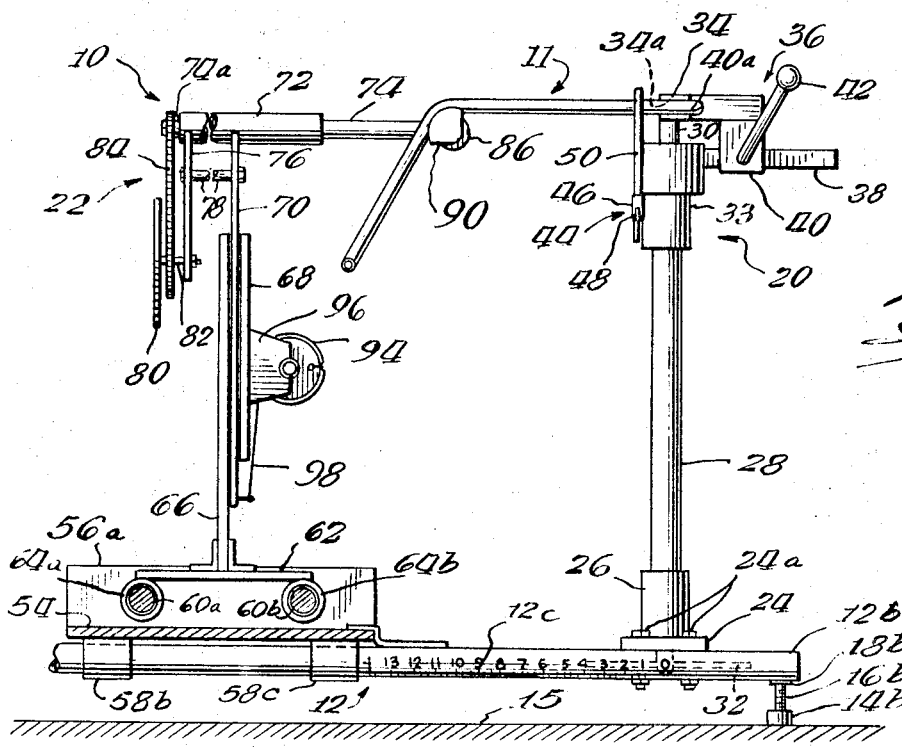
FIG. 2 is a front elevational view of the apparatus shown in FIG. 1.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

The apparatus 10 of this invention is intended for use in measuring tubular stock 11 and particularly for measuring the angle of the bends in the stock, the distance between the bends, and the planar deviation of such bends.

Apparatus 10 includes a frame 12 comprised of a pair of parallel spaced elements, such as bars 12a and 12b, one of which, such as 12b, may be provided with a scale as shown at 12c. Each bar 12a and 12b is provided with feet 14a and 14b, respectively, for supporting the frame on a suitable supporting surface 15. Each of the feet is at the base of a threaded shank 16a and 16b which is adjustable with respect to the frame by means of a lock nut 18a and 18b, respectively. Generally speaking, the apparatus is divided into two major sub-portions, a bend gripping portion 20 and a bend receiving portion 22.

Gripping portion 20 includes a plate 24 which spans bars 12a and 12b and is secured thereto by suitable fastening means, such as the several bolts 24a. The plate is slotted adjacent bar 12b as shown at 24b. A hub 26 extends generally centrally upwardly of plate 24 and supports a sleeve 28. A rod 30 is rotatably received within the sleeve 28 and projects outwardly from the opposite ends of the sleeve. At its lower end, below plate 24, rod 30 has a circular protractor 32 secured thereon by suitable means such as a nut 32a. Compass 32 has indicia 32b representative of values of angular deviation for measurement. Thus, as rod 30 is rotated, the protractor 32 will be rotated and the amount of angular deviation resultant from the rotation of the rod 30 may be read from the indicia 32b which projects through the opening 24b in plate 24.

At the top of sleeve 28 there is provided a hub 33 having a portion 33a which is rotatable with respect to the sleeve 28 and a portion 33b which is fixed on the sleeve 28 which supports other components of the gripping portion of the apparatus of this invention. The top of rod 30 is provided with a channeled tube receiving wheel or wheel segment 34, which has a semi-circularly recessed periphery 34a generally of a size and shape to nestably receive a portion of the periphery of a tube intended to be measured by the apparatus of this invention.

Tube clamp means 36 is mounted to the hub 33. Included in tube clamp means 36 is a bar 38 which projects outwardly from the hub and extends generally horizontally with respect to the orientation of intended use of the apparatus or generally parallel to platform 24 and bars 12a and 12b. Bar 38 slidably supports sliding block 40 which has a channeled tube gripping end 40a oriented so as to be substantially coplanar with the portion 34a of wheel segment 34. End 40a is of a size and shape to nestably mate with a portion of the periphery of tubular stock intended to be measured by the apparatus. An operator handle 42 is provided for locking the block 40 on bar 38. To grip a piece of tubular stock 11 in the gripping portion 36, the block 40 is moved outwardly or away from rod 30, tubular stock is positioned in the channeled periphery 34a of wheel 34 and then the sliding block 40 is moved until the recessed portion 40a nestably abuts the portion of the periphery of the tubular stock 11 which is opposite from that received in the segment 34. The operator handle 42 is then moved to lock the block 40 in this position and thereby securely hold the tubular stock against the wheel 34.

A stop assembly 44 is also connected to hub portion 33b and includes a block 46 and a generally uprightly extending arm 50 which is vertically movable with respect to the block 46. In use, a tube is first gripped between the members 40 and 34 with the protractor reading at zero as shown in FIG. 6.

Then the tube is grasped to rotate the same and the rod 30 until the rod abuts the upstanding arm 50 of the stop assembly. At this point, the number representing the interior angle between the bend is observed through the opening 24b as seen in FIG. 7.

The next bend of the tube is positioned in the bend receiving assembly 22. Bend receiving assembly 22 includes a table 54 movably mounted on the frame 12. The table includes opposite upturned ends 56a and 56b and depending sleeves 58a, 58b, 58c and 58d through which are slidably telescoped the rods 12a and 12b which comprise the frame 12. By this arrangement, the table 54 is slidably mounted on the frame 12 for movement toward and away from the gripping portion. Rods 60a and 60b extend across table 54, generally transverse to the axial extent of the sleeves 58a through 58d and the bars 12a and 12b. A platform 62 is slidably mounted on the rods 60a and 60b by means of depending sleeves 64a and 64b for movement of the platform 62 transversely of the bars 12a and 12b.

A generally centrally positioned upstanding strut 66 extends above the platform 62. Spaced web 68 is joined at one side 68a to the strut 66. Bar 70 is slidably received between the spaced web 68 and the strut 66 for upright or vertical movement with respect to the strut 66. Bar 70 supports sleeve 72, the axis of which is generally parallel to the axis of rods 12a and 12b of the frame. A rod 74 is rotatably received within the sleeve 72 and has opposite ends such as 74a and 74b which project beyond the sleeve 72. A bar 76 depends from sleeve 72 generally parallel to and spaced from the bar 70 and adjacent the end 74a of the rod 74. Bars 76 and 70 are tied together by means of fastener 78 which extends between the two.

A protractor or angular deviation measuring means 80 is mounted, by means of shaft 82, to the bar 76. A chain 84 extends around a sprocket behind compass 80 (not shown) and the sprocket 84a mounted on the end 74a of rod 74. Sprocket 80 is connected with dial indicator 85. Thus, as rod 74 rotates with respect to sleeve 72, the dial indicator for protractor 80 will also rotate.

On end 74b of rod 74 a transversely extending sleeve 86 is mounted. This sleeve has an axial extent generally parallel to the direction of movement of platform 62 or substantially transverse to that of the rods 12a and 12b. Sleeve 86 supports therein a rod 88 which is rotatable relative to the sleeve. At one end of the rod there is fixed a circular segmental tube receiving member 90 having a recessed periphery 92 generally of a shape to nestably receive tubular stock with which the machine is intended to be used.

Bar 70 and, therefore, sleeve 72 and the associated rod 74, sleeve 86 and rod 88, is vertically adjustable with respect to the strut 66 and therefore the platform 62 by means of a cable counterweight mechanism 94 rotatably mounted in brackets 96 on web 68, and cable 98 which extends from pulley counterweight mechanism 94.

With the workpiece clamped in measuring position in the gripping portion, the first bend and adjacent legs will be disposed parallel to the surface supporting the apparatus and the second bend will be in a position to be measured. Receiving member 90 is now positioned in the second bend so that the workpiece fits closely in the recessed periphery 92. Motion of the receiving portion along rods 60 and motion of bar 70, rod 74 and rod 88 permits this positioning of member 90. The angular and longitudinal position of member 90 can now be read from dial 80 and scale 12c respectively.

It is to be understood that instead of the protractors 32 and 80 shown herein that the other forms of readout of the increment of angular deviation could be utilized. For example, the rotatable elements associated with the protractor could be connected directly to a readout mechanism which would give a visual readout of the amount of angular deviation responsive to movement of the tube gripping elements. In either case, whether or not protractors or other readout mechanisms are utilized, a suitable means would be provided for presenting a readout of the angular deviation of the respective portion of the workpiece being measured by the device.

The foregoing detailed description has been given for clearness of understanding only, and no unnecessary limitations should be understood therefrom, as some modifications may be obvious to those skilled in the art.

I claim:

1. An apparatus for measuring the location and angular deviation of bends in a workpiece comprising: a frame; a movable means on the frame for gripping a first bent portion of a workpiece, said movable gripping means being movable from a zero position to an infinite number of positions of deviation therefrom; angular deviation readout means associated with said gripping means to measure the angular value of the bent portion gripped by the gripping means responsive to movement of the gripping means from said zero position to a position of angular deviation therefrom; second means on said frame spaced from said gripping means for receiving and measuring the angular deviation of a second bent portion of a workpiece while the first portion is retained in said gripping means; and measuring means being associated with said receiving mean sand gripping means for measuring the linear distance between said first and second bent portions of said workpiece.

2. The apparatus of claim 1 wherein said gripping means is rotatable.

3. The apparatus of claim 2 wherein said receiving means is universally adjustable.

4. The apparatus of claim 2 including stop means at said gripping station for limiting the deviation of the gripping means from said zero position.

5. The apparatus of claim 4 wherein said receiving means includes an arcuate segment having a surface thereon for nestably receiving the second bend of the workpiece.

6. The apparatus of claim 5 wherein the arcuate segment is movably connected to vertically and laterally adjustable means mounted on said frame.

7. The apparatus of claim 5 wherein the arcuate segment is connected to a member associated with an angular deviation readout means for measuring the planar deviation of the portion of the workpiece between said first and second bends responsive to movement of the arcuate segment to a position for receiving the second bend of the workpiece.

8. An apparatus for measuring the location and angular deviation of bends in a workpiece comprising: a frame; a movable means on the frame for gripping a first bent portion of a workpiece, said movable gripping means being movable from a zero position to an infinite number of positions of deviation therefrom; angular deviation readout means associated with said gripping means to measure the angular value of the bent portion gripped by the gripping means responsive to movement of the gripping means from said zero position to a position of angular deviation therefrom; second means on said frame spaced from said gripping means for receiving a second bent portion of a workpiece; and means operably associated with the receiving means for measuring the planar deviation of the second bent portion of the workpiece while the first portion is retained in said gripping means.

9. The apparatus of claim 8 wherein said receiving means includes an arcuate segment having a surface thereon for nestably receiving the second bend of the workpiece.

10. The apparatus of claim 9 wherein the arcuate segment is movably connected to vertically and laterally adjustable means mounted on said frame.

11. The apparatus of claim 9 wherein the arcuate segment is connected to a member associated with a angular deviation readout means for measuring the planar deviation of the portion of the workpiece between said first and second bends responsive to movement of the arcuate segment to a position for receiving the second bend of the workpiece.

References Cited

UNITED STATES PATENTS

| 2,832,152 | 4/1958 | Blackshaw | 33—180(A) |
| 3,365,804 | 1/1968 | Fjellstrom | 33—174(N) |

FOREIGN PATENTS

| 227,622 | 1/1925 | Great Britain | 33—174 |

SAMUEL S. MATTHEWS, Primary Examiner